United States Patent [19]

Gillespie et al.

[11] Patent Number: 5,683,607
[45] Date of Patent: Nov. 4, 1997

[54] β-ANNEALING OF TITANIUM ALLOYS

[75] Inventors: Franna S. P. Gillespie, Auburn; Marc R. Matsen, Seattle, both of Wash.

[73] Assignee: The Boeing Company, Seattle, Wash.

[21] Appl. No.: 696,772

[22] Filed: Aug. 14, 1996

Related U.S. Application Data

[60] Division of Ser. No. 452,216, May 26, 1995, which is a continuation-in-part of Ser. No. 406,439, Mar. 17, 1995, which is a division of Ser. No. 151,433, Nov. 12, 1993, Pat. No. 5,420,400, which is a continuation-in-part of Ser. No. 777,739, Oct. 15, 1991, Pat. No. 5,410,132.

[51] Int. Cl.$^6$ .................................................. H05B 6/10
[52] U.S. Cl. ........................... 219/633; 219/618; 228/157
[58] Field of Search ........................ 219/600–604, 219/615, 618, 659, 633, 673, 676; 228/157, 190, 193, 173.2; 72/60; 428/593; 29/17.2; 148/565, 670, 671

[56] References Cited

U.S. PATENT DOCUMENTS

| | | |
|---|---|---|
| 2,984,732 | 5/1961 | Herbert . |
| 3,110,961 | 11/1963 | Melill et al. . |
| 3,340,101 | 9/1967 | Fields, Jr. et al. . |
| 3,444,275 | 5/1969 | Willett . |
| 3,466,726 | 9/1969 | Savolainen . |
| 3,529,458 | 9/1970 | Butler et al. . |
| 3,547,751 | 12/1970 | Morgan . |
| 3,595,060 | 7/1971 | Hundy . |
| 3,605,477 | 9/1971 | Carlson . |
| 3,661,491 | 5/1972 | Troyer . |
| 3,705,284 | 12/1972 | Binard . |
| 3,890,819 | 6/1975 | DeLuca . |
| 3,895,436 | 7/1975 | Summers et al. . |
| 3,920,175 | 11/1975 | Hamilton et al. . |
| 3,924,793 | 12/1975 | Summers et al. . |
| 3,927,817 | 12/1975 | Hamilton et al. . |
| 3,934,441 | 1/1976 | Hamilton et al. . |
| 3,974,673 | 8/1976 | Fosness et al. . |
| 3,996,019 | 12/1976 | Cogan . |
| 4,060,364 | 11/1977 | Gras . |
| 4,111,024 | 9/1978 | Dahlman et al. . |
| 4,117,970 | 10/1978 | Hamilton et al. . |

(List continued on next page.)

FOREIGN PATENT DOCUMENTS 1419327 12/1975 United Kingdom .

OTHER PUBLICATIONS

Border et al., "Induction Heated Joining of Thermoplastic Composites Without Metal Susceptors," *34th International SAMPE Symposium*, May 3–11, 1989, pp. 2569–2578.

Sumida, et al., "Pan Based High Modulus Graphitized Carbon Fiber Torayca M60J". *34th International SAMPE Symposium*, May 8–11, 1989, pp. 2579–2589.

Quarterly Government Report for Sep. 1992 throught Nov.

*Primary Examiner*—Tu B. Hoang
*Attorney, Agent, or Firm*—John C. Hammar

[57] ABSTRACT

Capitalizing on the unique feature of our induction heating workcell that permits rapid and controlled heating and cooling of a workpiece within a wide temperature range permits combining several manufacturing operations into a single heating cycle to save time, energy, capital, touch labor, and factory space. For example, we can combine superplastic forming (SPF) with brazing, two operations that occur at temperatures that differ by about 150–200° F. (85–105–C.) or more, to produce quality parts. Or, we can combine SPF with β-annealing; of titanium. Finally, we can combine forming, brazing, and annealing into an economical single cycle. Illustrating our combined cycles, we produce multisheet SPF parts with braze joints at selected locations with improved energy efficiency and at lower cost by heating the multisheet pack to its superplastic forming range below the melting point of the braze alloy, superplastically forming the pack to define braze joints having unmelted braze alloy; increasing the temperature to the braze temperature of the braze alloy, and cooling the pack below the superplastic range to freeze the braze alloy in the braze joint.

8 Claims, 5 Drawing Sheets

U.S. PATENT DOCUMENTS

| | | |
|---|---|---|
| 4,141,484 | 2/1979 | Hamilton et al. . |
| 4,145,903 | 3/1979 | Leach et al. . |
| 4,150,927 | 4/1979 | Steingroever . |
| 4,188,811 | 2/1980 | Brimm . |
| 4,217,397 | 8/1980 | Hayase et al. . |
| 4,233,829 | 11/1980 | Hamilton et al. . |
| 4,233,831 | 11/1980 | Hamilton et al. . |
| 4,263,375 | 4/1981 | Elrod . |
| 4,269,053 | 5/1981 | Agrawal et al. . |
| 4,292,375 | 9/1981 | Ko . |
| 4,304,821 | 12/1981 | Hayase et al. . |
| 4,306,436 | 12/1981 | Schulz et al. . |
| 4,331,284 | 5/1982 | Schulz et al. . |
| 4,351,470 | 9/1982 | Swadling et al. . |
| 4,354,369 | 10/1982 | Hamilton . |
| 4,361,262 | 11/1982 | Israeli . |
| 4,426,032 | 1/1984 | Leodolter . |
| 4,474,044 | 10/1984 | Leistner et al. . |
| 4,524,037 | 6/1985 | Marc . |
| 4,530,197 | 7/1985 | Rainville . |
| 4,544,339 | 10/1985 | Itoh . |
| 4,555,373 | 11/1985 | Bloemkolk et al. . |
| 4,563,145 | 1/1986 | de Meij . |
| 4,584,860 | 4/1986 | Leonard . |
| 4,603,089 | 7/1986 | Bampton . |
| 4,603,808 | 8/1986 | Stacher . |
| 4,622,445 | 11/1986 | Matsen . |
| 4,635,461 | 1/1987 | Raymond . |
| 4,649,249 | 3/1987 | Odor . |
| 4,657,717 | 4/1987 | Cattanach et al. . |
| 4,706,361 | 11/1987 | Meyer et al. . |
| 4,713,953 | 12/1987 | Yavari . |
| 4,716,072 | 12/1987 | Kim . |
| 4,824,617 | 4/1989 | Takeuchi et al. . |
| 4,833,768 | 5/1989 | Ecklund et al. . |
| 4,852,280 | 8/1989 | Ghosh . |
| 4,855,011 | 8/1989 | Legge et al. . |
| 4,882,823 | 11/1989 | Weisert et al. . |
| 4,888,973 | 12/1989 | Comley . |
| 4,889,276 | 12/1989 | Cadwell et al. . |
| 4,901,552 | 2/1990 | Ginty et al. . |
| 4,906,172 | 3/1990 | Stewart . |
| 4,951,491 | 8/1990 | Lorenz . |
| 4,984,348 | 1/1991 | Cadwell . |
| 4,988,037 | 1/1991 | Cadwell . |
| 5,024,369 | 6/1991 | Froes et al. . |
| 5,032,327 | 7/1991 | Becheret . |
| 5,047,605 | 9/1991 | Ogden . |
| 5,064,978 | 11/1991 | Scholz . |
| 5,093,545 | 3/1992 | McGaffigan . |
| 5,115,963 | 5/1992 | Yasui . |
| 5,118,026 | 6/1992 | Stacher . |
| 5,139,407 | 8/1992 | Kim et al. . |
| 5,141,146 | 8/1992 | Yasui . |
| 5,229,562 | 7/1993 | Burnett et al. . |
| 5,289,965 | 3/1994 | Yasui et al. . |
| 5,410,132 | 4/1995 | Gregg et al. . |
| 5,420,400 | 5/1995 | Matsen . |

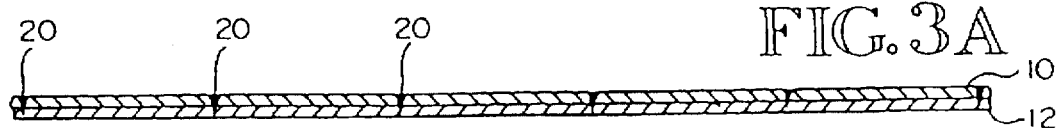
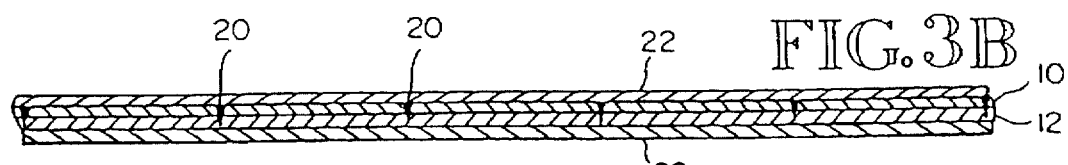
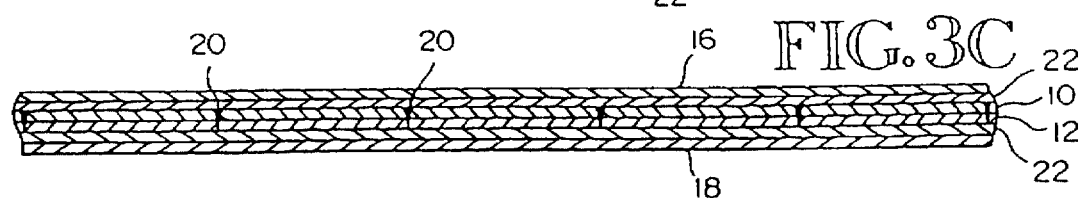
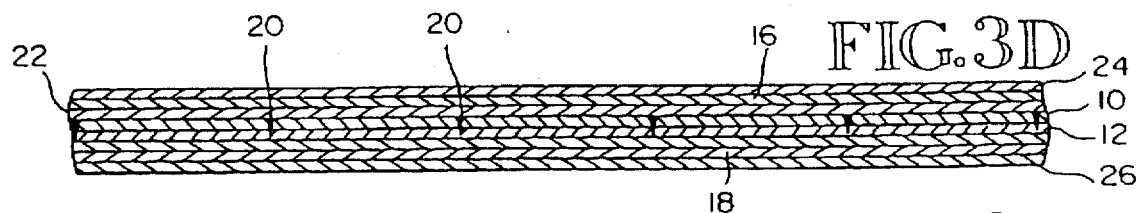
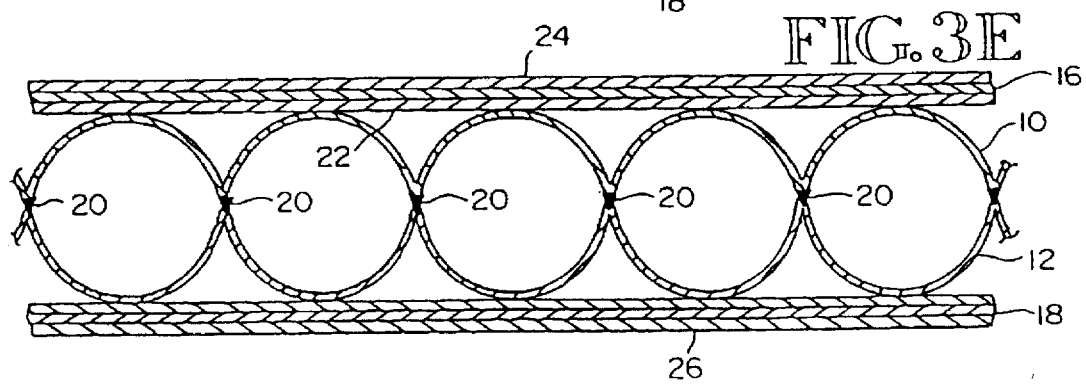
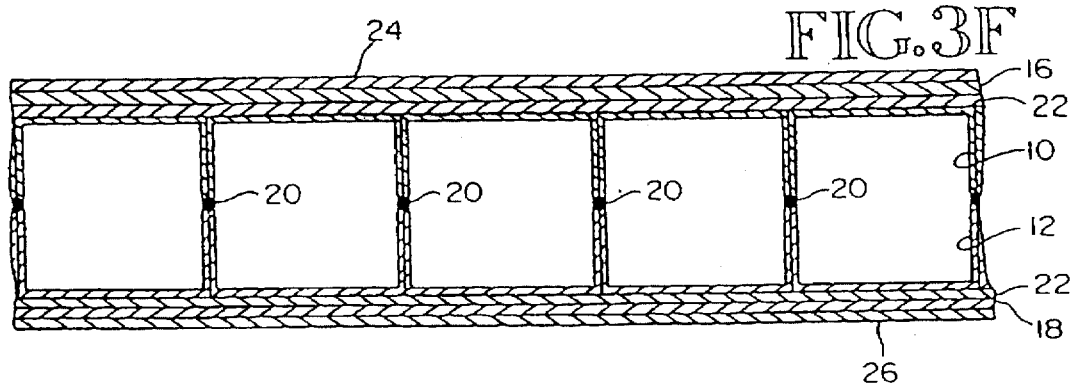

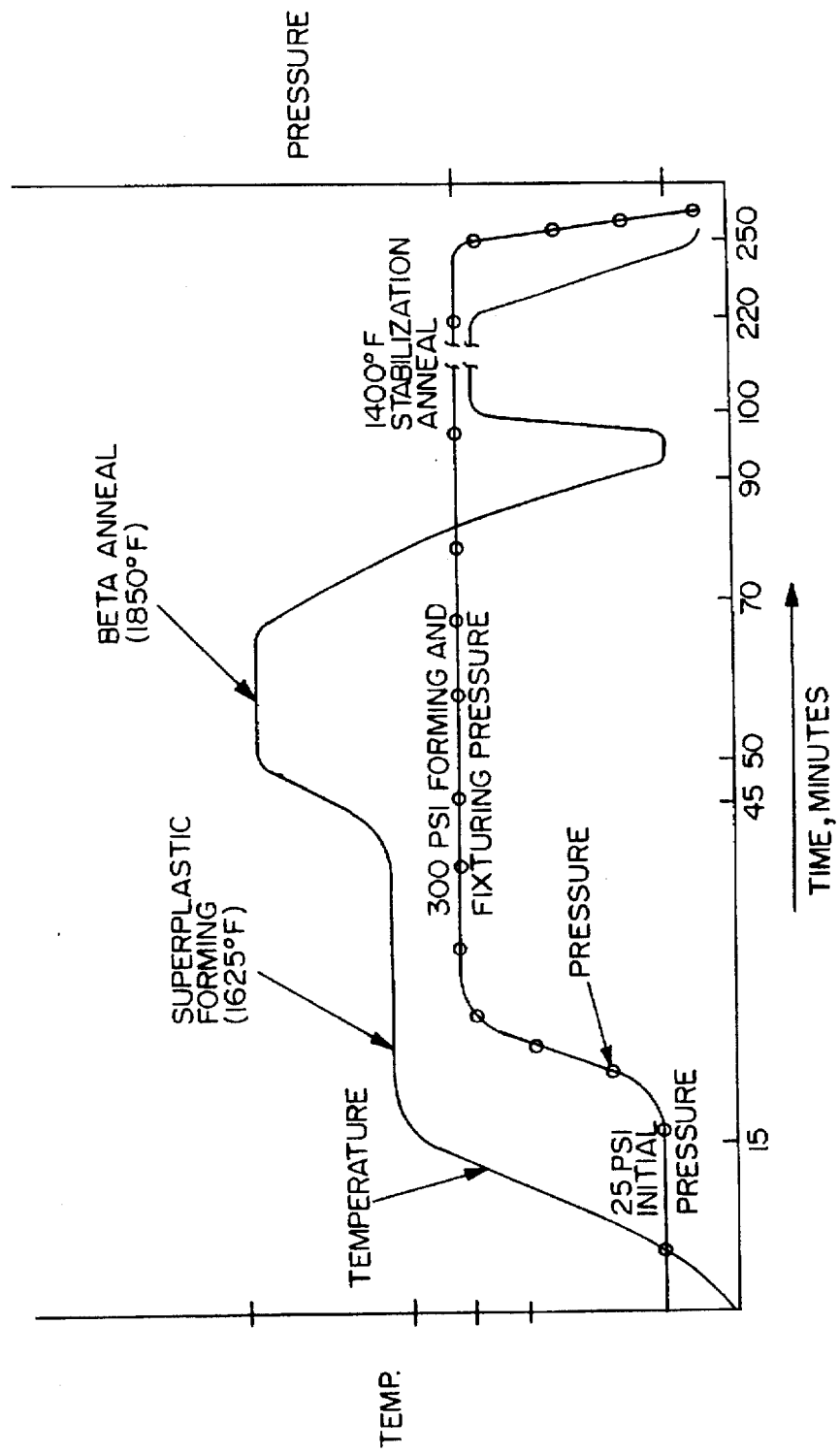

β-ANNEALING OF TITANIUM ALLOYS

REFERENCE TO RELATED APPLICATIONS

The present application is a divisional application based upon U.S. patent application Ser. No. 08/452,216, filed May 26, 1995, which was a continuation-in-part application based upon U.S. patent application 08/406,349, filed Mar. 17, 1995, which is a divisional application of U.S. patent application Ser. No. 08/151,433, filed Nov. 12, 1993, now U.S. Pat. No. 5,420,400, which is a continuation-in-part application based upon U.S. patent application 07/777,739, filed Oct. 15, 1991, now U.S. Pat. No. 5,410,132; the present application also is related to U.S. Pat. No. 4,622,445. We incorporate these applications and patents by reference.

NOTICE OF GOVERNMENT RIGHTS

This invention was made with Government support under Contract F33657-91-C-0006 awarded by the Air Force. The Government has certain rights in this invention.

TECHNICAL FIELD

The present invention relates to energy efficient and timesaving methods combining multiple manufacturing operations in an induction heating workcell into a single heat cycle, especially improving operations that involve the manufacture of parts by superplastic forming (SPF).

BACKGROUND ART

Under certain conditions, some materials can be plastically deformed without rupture well beyond their normal limits, a property called superplasticity. This property is exhibited by certain metals and alloys, within limited ranges of temperature and strain rate. For example, titanium and its alloys are superplastic in the temperature range from about 1450°–1850° F. (785°–1010° C.).

Superplastic forming (SPF) is a fabrication technique that relies on superplasticity. A typical SPF process involves placing one or more sheets of metal or plastic in a die, heating the sheets to an elevated temperature within the superplastic range, and superplastically forming the sheet(s) at the SPF temperature. Generally, a differential forming pressure from a gas manifold is used to stretch the sheet(s) into the desired shape against the die surface(s). This forming process can be called blow molding insofar as it uses differential pressure to form the material. The differential pressure is selected to strain the material at a strain rate that is within its superplastic range. The following patents are illustrative of SPF processes and equipment:

| PATENT | TITLE | ISSUE DATE |
| --- | --- | --- |
| 3,920,175 | Method of SPF of Metals with Concurrent Diffusion Bonding | November 18, 1975 |
| 3,927,817 | Method for Making Metallic Sandwich Structures | December 23, 1975 |
| 3,605,477 | Precision Forming of Titanium Alloys and the Like by Use of Induction Heating | September 29, 1971 |
| 4,141,484 | Method of Making a Metallic Structure by Combined Flow Forming and Bonding | February 27, 1979 |
| 4,649,249 | Induction Heating Platen for Hot Metal Working | March 10, 1987 |
| 4,117,970 | Method for Fabrication of Honeycomb Structures | October 3, 1978 |
| 5,024,369 | Method to Produce Superplastically Formed Titanium Alloy Components | June 18, 1991 |

One advantage of SPF is the forming of complex shapes from sheet metal while reducing the time and eliminating the waste of milling, producing considerable cost saving. In addition, the SPF process is generally applicable to single and multisheet fabrication. For multisheet fabrication, SPF is combined with joining processes, such as diffusion bonding, brazing or laser welding, to produce complex sandwich structures. One advantage of the SPF process is lighter, lower cost parts with fewer fasteners. A single part can replace the complex assembly currently required using conventional manufacturing operations. Common applications of SPF include the manufacture of parts for aircraft, missiles, and spacecraft.

In a typical prior art SPF process for titanium or its alloys, the sheet metal is placed between dies, at least one of which has a contoured surface corresponding to the shape of the product. The dies, are placed on platens which are heated, generally using embedded resistive heaters. The platens heat the dies to about 1650° F. (900° C.). Because the titanium will readily oxidize at the elevated temperature, an inert gas, such as argon, surrounds the die and workpiece. The dies heat the sheet metal to the temperature range where the sheet metal is superplastic. Then, under applied differential pressure, the sheet metal deforms against the contoured surface.

The platens and dies have a large thermal mass. They take considerable time and energy to heat and are slow to change their temperature unless driven with high heat input or with active cooling. To save time and energy, they must be held near the forming temperature throughout a production run (i.e., the production of a number of parts using the same dies). The raw sheet metal must be inserted onto the dies, and formed parts removed, at or near the elevated forming temperature. The hot parts must be handled carefully at this temperature to minimize bending. Within the SPF range, the SPF metals have the consistency of taffy, so bending can easily occur unless the operators take suitable precautions.

As described to some degree in U.S. Pat. No. 4,622,445 and in U.S. Pat. No. 5,410,132, we have discovered an improvement for an SPF process coupling the use of ceramic dies with inductive heating. With our inductively heated SPF press or workcell, we can heat preferentially the sheet metal workpiece with induction heating without heating the platens or dies significantly and can use the ceramic dies as an insulator to hold the induced heat in the part. We can stop the heating at any time and can cool the part relatively quickly even before removing it from the die. We do not waste the energy otherwise required to heat the large thermal mass of the platens and dies. We do not force the press operators to work around the hot dies and platens. With our inductive heating workcell, we also save time and energy when changing dies to set up to manufacture different parts because the dies and platen are significantly cooler than those in a conventional SPF press. We shorten the operation to change dies by several hours. Therefore, the induction heating process is an agile work tool for rapid prototyping or low rate production with improved efficiency and versatility.

U.S. Pat. No. 3,920,175 and 3,927,817 describe typical combined cycles for SPF forming and diffusion bonding. Diffusion bonding is a notoriously difficult and temperamental process that has forced many SPF fabricators away from multisheet manufacturing or to "clean room" production facilities and other processing tricks to eliminate the possibility of oxidation in the bond. Oxides foul the integrity of the bond. In addition, diffusion bonds are plagued with microvoids which are difficult to detect nondestructively, but, if present, significantly diminish the structural performance of the joint. Diffusion bonding also is a time consuming process. The part typically must be held at elevated temperature and elevated pressure (about 400 psi) for several hours. For example, in U.S. Pat. No. 3,920,175, the diffusion bonding operation takes five hours at 1650° F. (900° C.), making the forming/bonding operation six hours. In U.S. Pat. No. 3,927,817, diffusion bonding occurs prior to forming, still requires four to five hours, and forces a six hour bonding/forming cycle at 1650° F. (900° C.) for the entire period. Typically a hot press diffusion bonding process for common titanium alloys used in aerospace applications will require over eight hours at 2500 psi and 800° C. (1472° F.), about six hours at 400 psi and 900° C. (1650° F.), or about two hours at 250–300 psi and 950° C. (1742° F.). Producing this heat and pressure for this length of time is expensive.

The present invention is a timesaving process for combining SPF with at least one other manufacturing operation that promises higher quality parts at lower production costs with significant energy savings in shorter production times. The methods of the present invention capitalize on the ability of the induction heating press to rapidly change the temperature of the part on which it operates. For example, in a combined SPF/brazing cycle, the troubles of diffusion bonding are eliminated by replacing diffusion bonding with brazing so that a much more efficient manufacturing cycle is possible. Manufacturers have greater assurance in the integrity of the brazed bond, can achieve a satisfactory brazed bond quickly and reliably, and can process the multisheet pack with a single heating cycle without removing the pack from the press. Conventional processing requires a significantly higher investment in capital equipment and requires the use of separate equipment maintained at the different temperatures to produce parts that require multiple, elevated temperature manufacturing operations. In our invention, we combine heating cycles to reduce hand labor, capital equipment cost, and energy consumption. We can combine SPF and brazing into a single heat cycle. We can also combine SPF with beta-annealing of titanium or its SPF alloys and might also include other heat treatments in the same cycle. We achieve this flexibility by focusing the heating on the part we are forming using an induction heater. We hold the part within insulating ceramic dies that are transparent to the time-varying magnetic field that our induction heater produces. We significantly reduce cycle time in manufacturing modern aerospace parts.

SUMMARY OF THE INVENTION

By combining operations into a single, sequential heat cycle with rapid temperature adjustments between the manufacturing operations, we use our induction heating process in agile manufacturing operations that save us significant time while consuming far less energy and far less investment capital than conventional manufacturing operations. Furthermore, we enhance safety by reducing or eliminating the need for operators to transfer hot work-in-process between processes. We save floor space by combining operations within one workcell. We achieve these benefits by the generic process of combining several elevated temperature manufacturing operations into a single heating cycle for the part as we complete the several combined operations at significantly different temperatures in our induction heating workcell through the focusing and control of heating using induction heating. The present invention provides, for example, a combined method for superplastic forming (SPF) and brazing preferably using an induction heating SPF workcell like that described in U.S. Pat. No. 4,622,445 or U.S. Pat. No. 5,410,132. The induction heaters cause the sheet metal workpiece to heat but not the ceramic dies, leading to much shorter heating and cooling cycles as compared to the prior art technique of using resistive heaters and metal dies. This SPF/brazing process is the primary focus of U.S. Pat. No. 5,420,400. A preferred method of the present invention, then, comprises the steps of assembling a pack of SPF sheet metal sheets having braze alloy placed where braze joints will be located in the finished part, inductively heating the pack to the superplastic forming range, forming the pack to define the braze joints, increasing the temperature to reach the braze temperature or melting point of the braze alloy to allow the alloy to flow in the area of the braze joint, and cooling the part below the superplastic forming range.

Another preferred manufacturing operation combines superplastic forming with subsequent beta-annealing and optionally additional heat treatment. This combined cycle process permits machining of flat sheets of titanium (6Al-4V) ELI alloy with subsequent forming in our induction heating press and then beta-annealing to increase the fracture strength in the final product. The annealing involves heating the part to about 1850°–1950° F. for a predetermined time while maintaining the elevated forming pressure to achieve geometric stability in the completed part followed by a controlled cooling to around ambient temperature at a rate between about 30°–85° F./minute to achieve the desired optimum microstructure (or, at least to about 500° F.). Then the part is reheated to about 1400° F. and held for an extended period to achieve the desired stabilization anneal heat treatment.

BRIEF DESCRIPTION OF THE DRAWINGS

FIG. 3 A–F is a schematic cross-section of a preferred four-sheet pack-retort, illustrating the typical assembly process.

FIG. 5 is idealized pressure-temperature profile for a combined cycle induction heating operation involving forming, beta-annealing and stabilization annealing.

BEST MODE CONTEMPLATED FOR CARRYING OUT THE INVENTION

The present invention relates to improved manufacturing operations in which we can rapidly change the temperature of the workpiece to permit the combination of operations into a single heating cycle using a single, versatile manufacturing workcell, particularly our induction heating process. The basic induction heating process is described in considerable detail in our prior U.S. Pat. Nos. 4,622,445, 5,420,400, and 5,410,132 our copending U.S. patent application Ser. No. 08/341,779; which we incorporate by reference. Nevertheless, we will briefly describe that equipment and its basic operation. A more detailed description will then follow with respect to the illustrative preferred embodiments for combined cycles.

I. THE INDUCTION HEATING WORKCELL

Fundamentally, the induction heating workcell is a manufacturing tool capable of providing controlled heating and pressure to a workpiece mounted in the workcell to accomplish manufacturing operations including, e.g., forming, superplastic forming, brazing, diffusion bonding, consolidating, curing, welding, bonding, annealing, or heat treating. The workpiece can be isolated from the surrounding environment, usually by confining the workpiece within a metal envelope or bagging system, particularly like that described in copending U.S. patent application Ser. No. 08/341,779 or U.S. patent application Ser. No. 08/469,604 entitled "Method for Achieving Thermal Uniformity in Induction Processing of Organic Matrix Composites or Metals," which we incorporate by reference.

Figure 6:
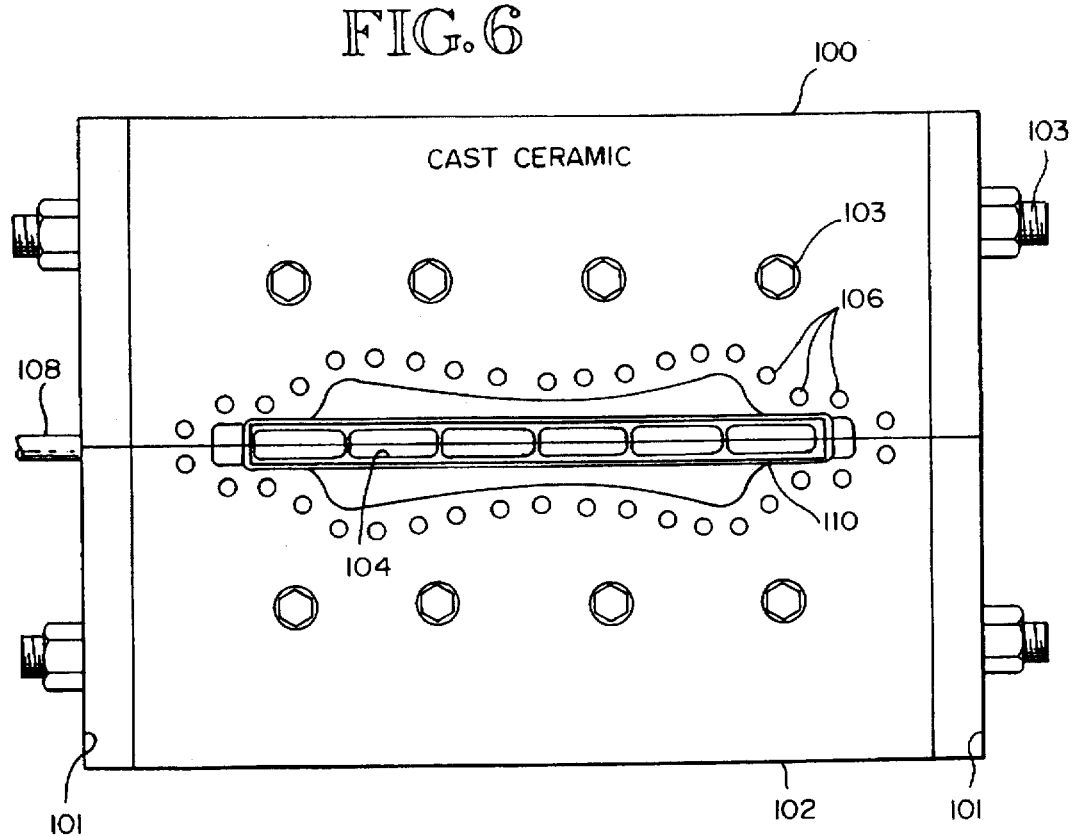
FIG. 6 is a schematic sectional view of a typical flat, milled part positioned in one workcell and ready for forming and annealing in accordance with a method of the present invention.

The workcell includes a pair of dies 100 & 102 (FIG. 6) preferably formed from a dielectric thermally insulating (i.e., relatively poor heat conducting), castable ceramic. The workpiece 104 is positioned between the dies. The base of the workcell includes four columns at corners of the dies. The upper or lower die conveniently may be rigidly mounted on the column through a jackscrew and threaded bore arrangement while the other die might float freely on the columns with bushings or other suitable means sliding over the outer dimensions of the columns. If free floating, then, appropriate nuts can be carried on the threaded portion of the jackscrews to stop motion of the dies in the desired location. In this way, the workcell can open to allow the workpiece to be positioned within the dies or withdrawn and can clamp on the workpiece to apply some of the pressure that we desire in the manufacturing operation or operations that we will complete in the workcell. Typically the dies are carried in metal strongbacks that actually are carried on the columns since the metal strongbacks are more durable. The strongbacks also allow the changing of dies relatively easily so that we can perform different operations requiring different dies with agility (i.e., significantly reduced machine setup or change delays). The strongback provides a stiff, flat surface backing the ceramic die to transfer the load applied through the columns evenly to the die. The strongback should have sufficient rigidity to keep the ceramic die from bending and cracking and, therefore, should hold the die rigid to a surface variation or tolerance under the applied pressure/stress of +0.003 in/ft$^2$ of die surface.

Each die contains a portion of the induction coil which we use to heat the workpiece. The induction coil, therefore, actually surrounds the workpiece and includes the several, spaced, parallel, straight coil segments 106 we embed in the dies plus peripheral jumper segments. The embedded coil segments are typically copper tubing. The copper carries the current which we use to create the oscillating, magnetic field that functions as our heat source. Coolant, usually water, circulates in the tubing to control the temperature of the tubing and the surround die. Although illustrated as circular pipe, the shape of the tubing is not critical. We also use rectangular channels.

At the edges of the dies, fittings on the tubing transition the embedded coil to insulated copper jumpers enclosed within a fluid-tight, flexible jacket. Here, the jumpers carry the current while the jacket carries the coolant. This jumper arrangement permits a range of travel between the dies of 3 inches or more. Other jumper/coolant arrangement might also be used.

The coil connects with a coil driver which supplies the power we desire to accomplish heating of the part. Typically, the power is anywhere up to about 400 kW at between about 3–10 kHz to create an oscillating magnetic field around the workpiece of high field strength and substantial uniformity. Temperature uniformity in the workpiece corresponds with the uniformity of the field to a great extent so we try to create a field that at any moment in time is the same throughout the volume of space within the coil. A uniform temperature in the workpiece ensures that all portions of the part are properly heated when we initiate a manufacturing operation, particularly forming or SPF. Also, a uniform field means that all portions of the workpiece will heat uniformly because they experience the same driver.

We prefer tool inserts within the ceramic dies to achieve even greater flexibility in operation by further reducing the mass of the die portions that are replaced during tool changes. Such tool inserts are ceramic blocks having faces shaped to the final part configuration and backing surfaces are designed for a friction fit alignment with corresponding surfaces fabricated into the corresponding die.

Each die is supported around its periphery with a compression frame 101 which we usually mold from phenolic resin, dielectric beams. Each die also includes preloaded, reinforcing tie rods 103 that are held between the corresponding frames in both the lateral and transverse directions. In this way, the compression frame functions to apply a compressive force to the ceramic. Furthermore, the frame defines the border of the die when the ceramic is cast.

II. A COMBINED SPF AND BRAZING CYCLE

Combining superplastic forming with metallurgical joining of the individual sheets of a multisheet pack, generally using brazing, in one thermal operation provides significant manufacturing cost advantage while reliably producing complex multisheet SPF parts. Typically, forming precedes brazing. Replacing diffusion bonding that is conventional in the art with a metallurgical bond or braze joint eliminates the uncertainties of structural integrity that worry manufacturers who rely on diffusion bonding. We can form a metallurgical bond quickly and reliably at lower pressures and significantly shorter processing times than a corresponding diffusion bond. We can inspect the braze joint or metallurgical bond to verify its quality.

Figure 1:
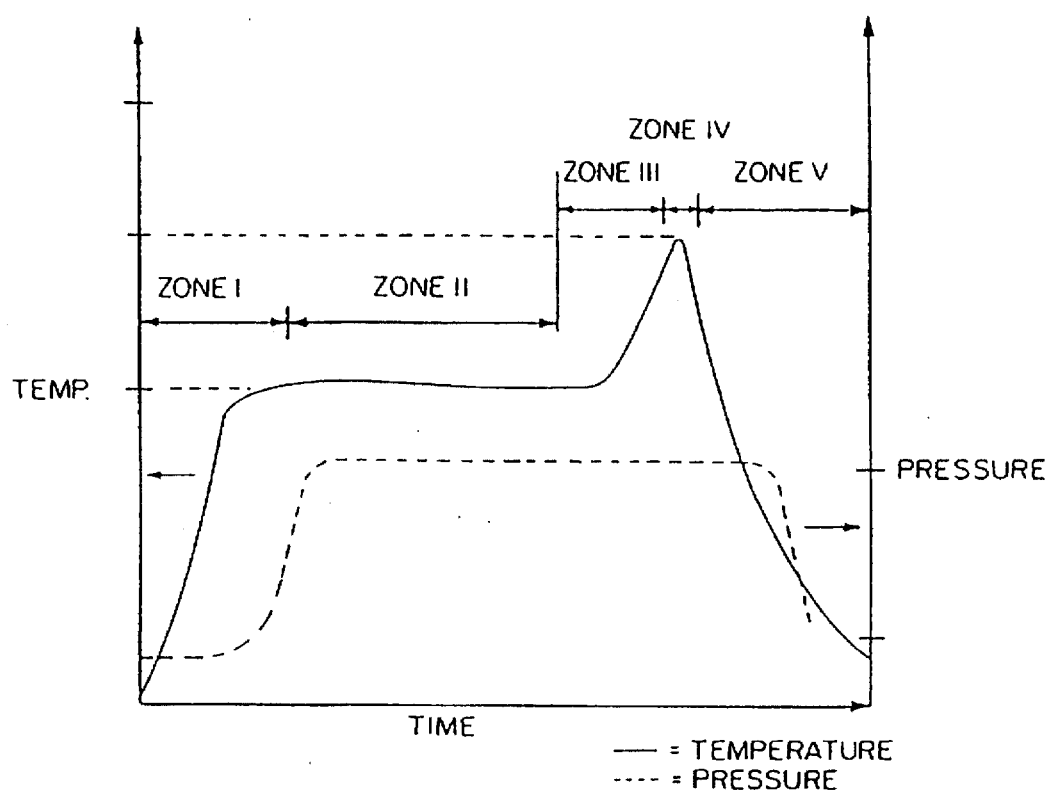
FIG. 1 is a typical, idealized pressure-temperature profile for the combined inductive heating cycle of the present invention.

As shown in FIG. 1, the idealized temperature-pressure cycle for a preferred SPF/brazing process of the present invention includes five processing zones. In Zone I, the multisheet pack is loaded to the SPF workcell (i.e., "press") and is heated inductively to the superplastic forming temperature for the pack. In Zone II, the press's gas manifold and gas control system creates differential pressure as the driving force in the pack to form the SPF parts with a preselected core cell geometry. In this step, the pack typically has sheets that are expanded to form a web, truss, or "honeycomb" structure between outer face sheets which may be formed or that may remain flat, as appropriate for the particular part being manufactured. Those skilled in the art of SPF manufacturing will understand how particular parts can be designed and laid up into the packs with suitable gas zones to produce the desired final shape. We illustrate two multisheet pack-retort lay-ups in FIGS. 2 and 3.

In Zone II, the SPF process also defines the location of braze joints in the finished part. When assembling the pack, braze alloy is affixed to one or more of the sheet metal sheets in these areas. A braze alloy is selected that has a melting point higher than the SPF forming temperature of the pack sheet metal so that the forming and brazing operations can be sequential in a single thermal cycle. Generally we use a braze alloy having a braze temperature about 150° F. (85° C.) above the SPF forming temperature when making titanium or titanium alloy parts.

After the SPF operation is complete, in Zone III, the pack is heated inductively to the higher melting point temperature of the braze alloy, and is held there briefly (Zone IV) to allow the alloy to melt and flow in the area of the braze joint. Finally, the heating is stopped and the part is allowed to cool (Zone V) below the SPF temperature, and the finished part is removed from the press.

Inductive heating is a significant advantage for this SPF/brazing operation because it permits rapid heating and cooling. Oscillating current in the induction coil within the ceramic dies creates a time-varying magnetic field that couples electromagnetically with the metallic pack to heat the pack rapidly by including eddy currents in the pack. The ceramic dies are a natural refractory material that has a low heat transfer coefficient and are an effective thermal insulation; they surround the pack. The induction only creates eddy currents in sheets on the outside of the metal. The pack and the dies hold the heat produced by induction in these sheets. Energy is not wasted in heating a huge thermal mass otherwise typical for conventional SPF presses. While the pack might have a temperature of 1650° F. (900° C.), the ceramic dies will only heat to on the order of 100°–400° F. (37°–205° C.) and, preferably 100°–200° F. (37°–93° C.) remote from the forming surface. Hence, there are significant energy savings and the workplace is a safer and more pleasant environment. The forming operation can proceed more quickly between tool changes or setup as occurs frequently in agile aerospace production where parts are manufactured at low rates (e.g., 20/mon) with short production runs. Our workcell is particularly well suited to rapid prototyping.

The details of the forming/brazing operation of the present invention will next be discussed with reference to forming a four sheet titanium honeycomb part using Ti 6Al-4V alloy sheet metal and TiCuNi (70:15:15) braze alloy. Such a part includes three sheets (10, 12, 14; FIG. 2) that constitute the core material and two face sheets 16 and 18 that sandwich the core material. The five sheets constitute "a pack."

The three sheets (10, 12 and 14) of the core material are welded 20 (or joined in any other appropriate manner) in selected locations to join them in a pattern appropriate to form the desired core cell geometry (i.e., web, truss, honeycomb, etc.). Typically the core material is about 0.025 in thick sheet metal. We often use resistance or laser welding and may use stopoff material (i.e., a release agent) wherever the core material sheets are not welded together. We prefer to do without stopoff. The core material is welded around essentially its entire periphery, leaving appropriate gas inlets for the forming gas/differential pressure.

Braze alloy ribbon (0.001 in thick) 22 is spot welded to the appropriate locations on the face sheets 16 and 18 where the core material and respective face sheet will contact in the finished part. Again, we can apply stopoff material, if desired, at the remaining portions of the face sheets.

The core material is sandwiched between the face sheets with the braze alloy ribbons in contact with the corresponding locations on the core material where we will form braze joints. The face sheets may be welded substantially around their periphery (leaving the gas inlets, of course) to complete the pack. When we weld, we generally use an edge band doubler weld. The sheet metal stock is oversized to accommodate the welds and to allow trimming to produce the final, finished part.

A vacuum line into the pack allows evacuation or pressurizing of the volume between the face sheets where the core materials lay. The differential pressure zones necessary for the SPF forming are also laid out at this time, as those skilled in the art will understand.

The pack is sandwiched, in turn, between two 1008 steel sheets 24 and 26 that are welded or otherwise sealed around their periphery (leaving appropriate gas inlets 108 [FIG. 6]) to form a retort. As an alternative to welding, we can use the sheet sealing system that we described in copending U.S. patent application Ser. No. 08/341,779. In that system, we machine or form grooves around the periphery of the sheets and seat a sealing gasket in the groove so that the dies create a compression seal on the pack when they engage it. The sheets of the retort are coated on their inner sides with a release agent like boron nitride to keep the part from sticking to the retort. The retort sheets can be selected so that their Curie temperature is high enough to facilitate the forming and brazing operations. As those of ordinary skill understand, the Curie temperature is measure of the magnetic permeability of the ferromagnetic material used as the susceptor, so a judicious selection of the retort sheet material is necessary. For titanium, we typically use 1008 steel or copper. For aluminum, we use 1100 aluminum alloy.

The weld around the retort sheets defines an internal volume or cavity for the pack. At least one gas line permits evacuating or pressurizing this volume which surrounds the pack. Typically we purge both the retort cavity and the pack cavity with argon gas or another suitable inert gas.

The retort usually is coated with boron nitride and EVERLUBE, ceria, graphite, mixtures thereof, or another appropriate release agent on its outer surfaces to ensure that the retort does not stick to the dies.

We load the retort into the SPF press and connect the gas lines 108. With induction heating, we rapidly heat the retort and pack until they reach SPF forming temperature of about 1650° F. (900° C.). With our press, we can heat the part at a rate of about 165° F./min (92° C./min) so this heating step (Zone I in FIG. 1) takes about 10 min. During this heating stage, we prefer to purge the pack cavity with argon.

At the forming temperature, we ramp up the pressure (FIG. 1, Zone II) to apply the differential pressure that will form the part. The differential pressure and the forming temperature are maintained for the proper time (typically 40 min) while the part stretches superplastically into the configuration of the die and the core material expands to define the desired core material cell geometry and the locations of the braze joints where a face sheet and core material sheet sandwich a braze alloy ribbon. The differential pressure ensures that this sandwich brings the core material into intimate contact with the braze alloy ribbon.

With SPF forming complete, we increase the power to the induction coil to induce an increase in temperature in the retort and the temperature is ramped up (FIG. 1, Zone III) quickly at a rate of about 100° F./min (55° C./min) to the braze temperature (melting point) of the braze alloy, here about 1850° F. (1010° C.). The rate of gain should be as rapid as possible, while maintaining thermal uniformity. Radiant heat transfer from one hot spot on the part to a cooler neighboring location and convection in the cavities helps to maintain this temperature uniformity, should any discontinuities occur.

Once the braze alloy melts (i.e., the melting point is reached), the temperature can be brought down immediately, because sufficient flow will occur in the braze joint to ensure a quality bond. We turn off the induction coils at this point and achieve a cooling rate (FIG. 1, Zone V) of about 60° F./min (33° C./min). In this Zone, we reduce the differential pressure as well. When the retort cools below the superplastic forming range (and usually to about 600° F. (315° C.) or below), we remove the retort from the die. At 600° F. (315° C.), the part will have good strength and the risk of warping or other distortion when the retort contacts ambient air is significantly reduced.

We cut away the retort leaving the finished part for trimming and fitting.

The ceramic die faces usually are coated with a release agent as well to keep the retort from sticking to the die.

While our detailed example is about Ti-6Al-4V ELI alloy, titanium and its other SPF alloys (like standard Ti-6-4 or Ti-6-2-2-2), aluminum and its SPF alloys, stainless steel, or other SPF metals can readily be used in the combined SPF/brazing thermal cycle.

Although the braze alloy in our example melts at or above the β-transition (a.k.a. "β-transus") for titanium, the parts we wish to make require a β-transition annealing, so this fact is not a disadvantage. It may be a concern, however, with the fabrication of other parts. This fact along with performance issues will drive the braze alloy selection. Silver alloys are lower melting (~1750 of (954° C.)) and are an alternative braze when avoiding β-transus is desirable. Such silver braze alloys are typically foils about 0.002–0.004 in thick. We will discuss β-annealing in greater detail in section III.

We can also braze a metal matrix composite (MMC) film or sheet (i.e., a cladding) to the inner or outer surfaces of the face sheets of the pack in this combined forming/brazing cycle. For example, we might form a pack with two Ti-6Al-4V sheets for the core material brazed to two 0.031 in thick titanium MMC sheets that sandwich the core material and that in turn are bonded to outer face sheets of Ti-15-3-3-3. We are developing such Ti MMCs with 3M and we describe such MMCs in our quarterly technical report for September, 1992, through November, 1992, trader Contract No. MDA972-90-C-0018, Subcontract GS00347-KAS for ARPA. Making these products in the induction cycle we propose here improves them because they are exposed to elevated temperatures for a shorter time, thereby reducing interaction between the reinforcing fibers with the matrix metal.

Figure 4:
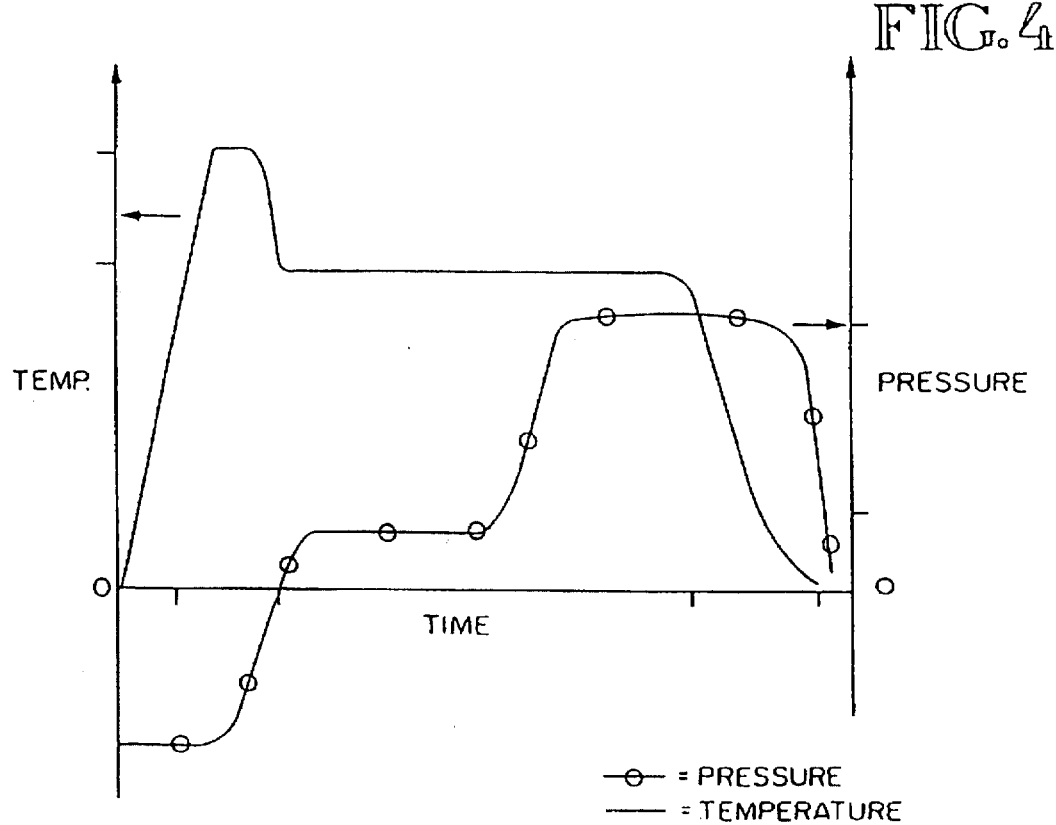
FIG. 4 is an idealized pressure-temperature profile for a combined cycle in which brazing precedes the forming operation.
Figure 2A:
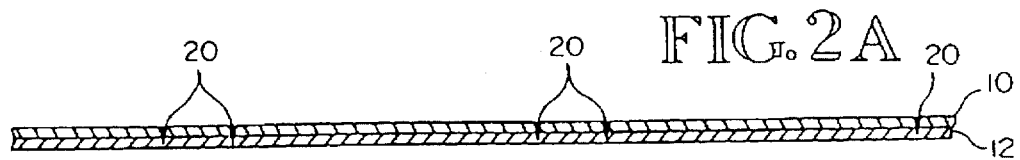
FIG. 2 A–F is a schematic cross-section of a preferred five-sheet pack and retort, illustrating the typical assembly process.
Figure 2B:
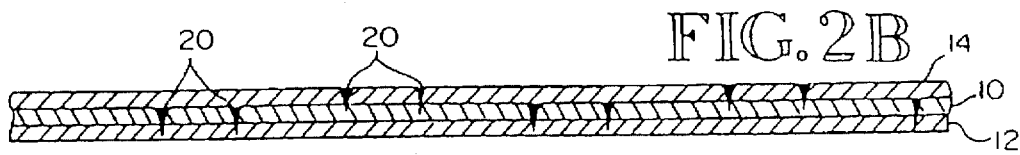
Figure 2C:
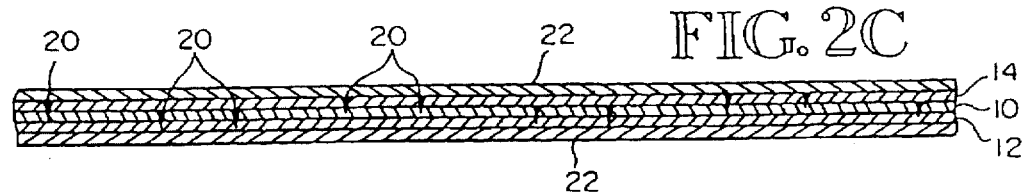
Figure 2D:
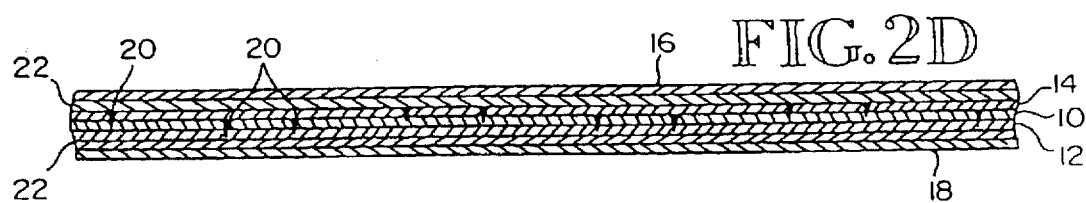
Figure 2E:
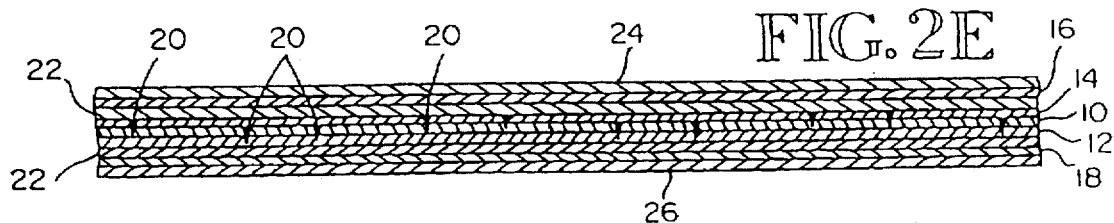
Figure 2F:
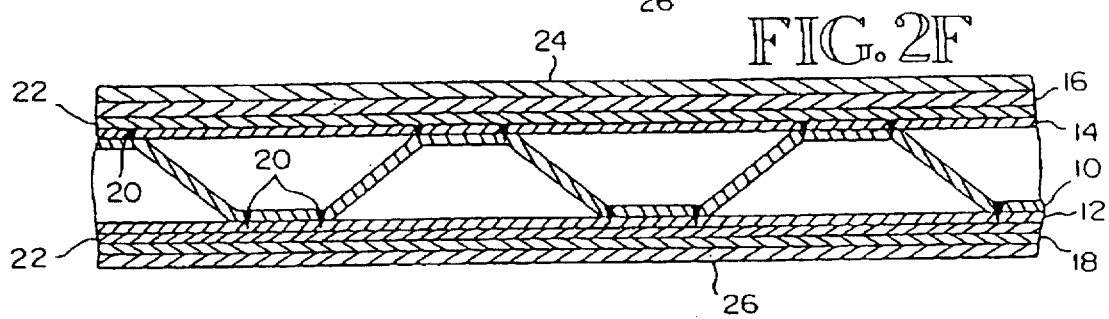

Of course, the brazing step can precede the forming step as schematically illustrated with the temperature-pressure profile of FIG. 4. There, the solid line represents the temperature profile and the "---0---0---" line the pressure. The temperature scale is on the left and the pressure scale on the right. If brazing precedes forming, stopoff material needs to be applied everywhere at metal:metal interfaces where braze joints will not be located. Brazing first, however, can improve the fatigue characteristics. Forming a braze fillet before SPF expansion seems to strengthen the finished part.

While this description has discussed only the forming of a braze joint using a braze alloy, those skilled in the art will recognize that the process is equally well suited to forming enhanced metallurgical bonds. Therefore, for this application, unless otherwise restricted to brazing, the terms "braze alloy" and "braze joint" should be interpreted to encompass the corresponding enhanced metallurgical bonding (EMB) concepts. Enhanced metallurgical bonds use a coating or thin foil to create, in combination with the base metal, a liquid interface at the joint when the EMB foil is activated at elevated temperature with subsequent diffusion of the constituents to give common microstructive at the joint for the joint and the base metal.

III. A COMBINED CYCLE FOR SPF AND β-ANNEALING

Another preferred combined cycle involves SPF followed by β-annealing and is especially desirable for titanium alloys, particularly Ti-6Al-4V, that are used in aerospace products. The combined cycle actually can also include brazing with the β-annealing step since the temperatures needed for these operations are corresponding or comparable. Therefore, in some circumstances the combined cycle completes three manufacturing operations; SPF, brazing, and annealing. As with our other preferred embodiments, this combined cycle saves time, touch labor, and energy. It produces better parts at lower cost. The combined cycle is possible primarily because of the ability to heat or cool the part rapidly and controllably using our induction heating workcell.

Our preferred cycle is illustrated in FIG. 5, which, like FIG. 4, charts the time dependence of temperature with the solid line () on a scale corresponding to the left abscissa and of pressure with the hatched line (---0---0---) on a scale corresponding to the right abscissa. Time, of course, is charted on the ordinate (at the bottom) increasing from left to right from process initiation to completion.

In the SPF-annealing combined cycle for Ti-6Al-4V, we raise the temperature rapidly from ambient to about 1625° F. (885° C.) at about 100°–120° F./min (55°–65° C./min) by heating the smart susceptor 110 inductively. Then we hold the temperature substantially constant and, with the part at temperature in the SPF temperature range of the alloy, we apply pressure gradually and controllably to superplastically form the part within the acceptable strain rate parameters, reaching a forming pressure of around 300 psi. We hold this pressure for the remaining processing steps until the part is completed with the desired shape and microstructure, an operation that typically takes about 4 hours.

After completing the superplastic forming of the part, we increase the temperature by increasing the power fed to the induction coil with its coil driver. When we reach the annealing temperature (about 1850° F. (1010° C.) for the β-annealing of Ti-6Al-4V ELI or 1950° F. (1165° C.) for standard Ti-6-4), we hold the temperature steady for the period necessary to complete the anneal. Thereafter, while maintaining the pressure over the part, we controllably cool the part to about 1200° F. at a rate of about 30°–85° F./min (16°–48° C./min), which is necessary to produce the optimum microstructure. During this cooling phase, generally we discontinue current flow in the induction coil while containing the circulation of cooling water. We also generally circulate pressurized argon gas in the retort that surrounds the part. The gas also acts as a cooling fluid to transport heat out of the part.

Next, we rapidly cool the part from about 1200° F. (650° C.) to about 500° F. (260° C.) without concern for controlling the cooling rate now that the micro structure is fixed. Finally, we reheat the part by reactivating the induction coil to heat the part to a temperature of about 1400° F. (760° C.) where we hold the temperature steady for about two hours to achieve a stabilization anneal. With, annealing completed, we rapidly cool the part, eliminating the over pressure and opening the induction heating press after the part has cooled below about 500° F. The formed part is removed from the retort and is ready for trim, clean, and finish machining.

We maintain pressure over the part during the stabilization anneal to maintain the desired geometry for the part.

Figure 7:
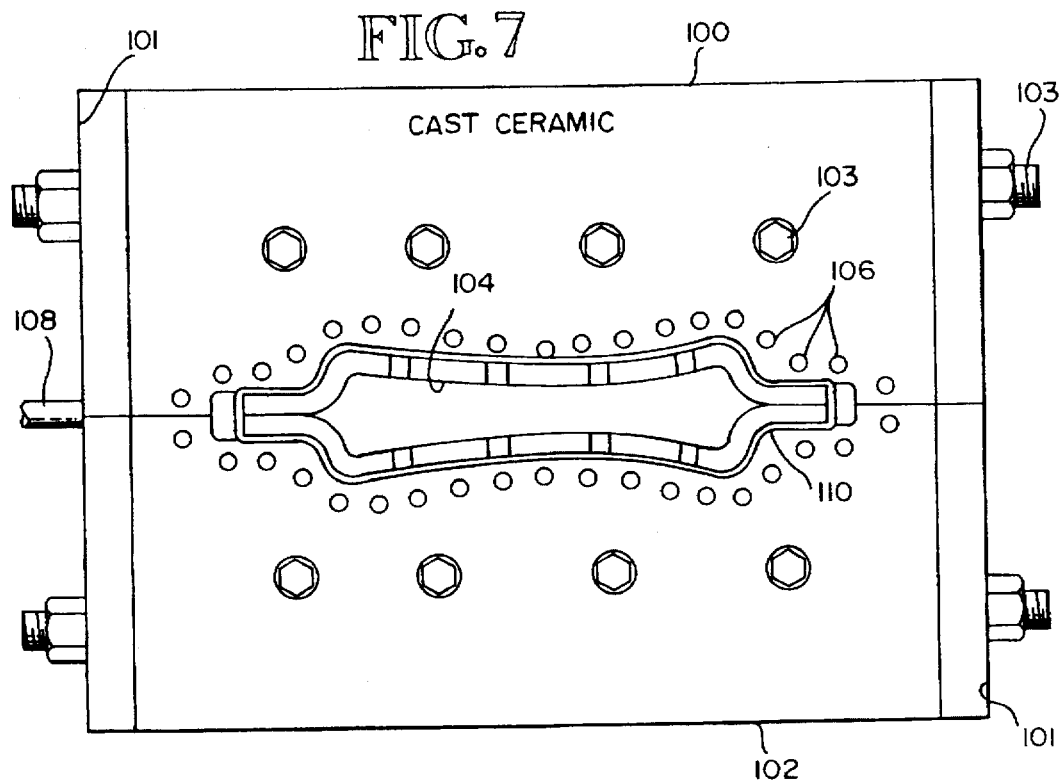
FIG. 7 is a schematic sectional view of the part of FIG. 6 after forming and annealing.

This SPF-annealing process is particularly valuable for the manufacture of aerospace parts, and reduces complex 5-axis milling of thick titanium blocks which is presently necessary for the manufacture of selected aft section parts in advanced aircraft. With this SPF-annealing process, we can machine the part with a flat geometry (FIG. 6), can then form the part to the desired, final geometry (FIG. 7), and finally can anneal the formed part to obtain the required strength, toughness, ductility, microstructure, and other chemical and physical properties. The combined cycle simplifies the machining/milling greatly reducing its cost principally by reducing the required machining time. Then, the machined intermediate is quickly, reliably, and readily formed and annealed in approximately the same time that the necessary annealing alone would require. We save material. We simplify machining. We save time and energy.

As with our other induction heating processes, we enclose the part or workpiece (here typically, the machined intermediate) within a retort fabricated from sealed metal sheets 110. The retort sheets function as a susceptor and are heated by the time-varying magnetic field that we create with the induction coil. The sealed retort sheets also permit us to surround the part with an inert gas atmosphere to prevent oxidation of the titanium and to control the microstructure during the annealing.

We manufacture the dies to conform to the desired final configuration of the completed part, accounting for relaxation as appropriate.

The rate and magnitude at which we apply pressure to superplastically form the intermediate to the appropriate final part geometry is dependent upon the part geometry. The forming time is typically on the order of 30 minutes although the time can vary widely depending upon the part's complexity, criticality, and geometry.

The β-annealing temperature of 1850° F. corresponds to the melting point of the Ti-Cu-Ni braze alloy that we typically use in our multisheet titanium SPF parts, like those described in section II, so the combined cycle is conducive to combining SPF with both brazing and annealing. If we anneal, we want to control the pressure, to control the cooling rate to obtain the optimum microstructure, and to complete a stabilization anneal, all within a single heating cycle.

While we have described preferred embodiments, those skilled in the art will recognize modifications or variations which might be made without departing from the inventive concept. The examples provided in sections II & III illustrate the invention and are not intended to limit it. Therefore, the description and claims should be interpreted liberally with only such limitation as is necessary in view of the pertinent prior art.

We claim:

1. A method for β-annealing of a titanium alloy using an induction heating press for rapid heating and controlled cooling to obtain desired microstructure in the alloy, comprising the steps of:

placing the alloy within the press, the press including an actively cooled induction coil embedded within a ceramic die set;

supplying an oscillating current to the induction coil to create a time-varying magnetic field to heat the alloy at a predetermined rate proportional to power supplied to the coil;

annealing the alloy at a predetermined temperature; and controllably cooling the alloy at a predetermined rate suitable to obtain the desired microstructure by discontinuing the supply of current to the coil while flowing coolant through the actively cooled induction coil to withdraw heat from the die set and, subsequently, the alloy.

2. The method of claim 1 wherein the alloy is enclosed within a retort comprising a material susceptible to heating through induced eddy currents created by the time-varying magnetic field and further comprising the step of surrounding the alloy with an inert atmosphere within the retort during heating, annealing, and cooling.

3. The method of claim 2 wherein the alloy is Ti-6Al-4V ELI, the annealing temperature is about 1850° F. (1010° C.), and the cooling rate is about 30°–85° F./min (16°–48° C./min).

4. The method of claim 1 wherein the cooling rate is about 30°–85° F./min (16°–48° C./min).

5. The method of claim 1 further comprising the step of circulating pressurized argon gas around the alloy during the controlled cooling.

6. The method of claim 1 further comprising the step of reheating the alloy to about 1400° F. (760° C.) in a stabilization anneal following the controlled cooling step.

7. The method of claim 1 further comprising the step of maintaining a pressure of about 300 psi on the alloy during the annealing and cooling steps.

8. The method of claim 7 further comprising the step of maintaining a pressure of about 300 psi on the alloy during the annealing, cooling, and reheating steps.

* * * * *